Jan. 8, 1952
D. J. BAKER
2,581,511

MAGNETIC PHONOGRAPH PICKUP

Filed Dec. 31, 1947
2 SHEETS--SHEET 1

INVENTOR.
DONALD J. BAKER
BY
Ralph B. Stewart
ATTORNEY

Jan. 8, 1952 D. J. BAKER 2,581,511

MAGNETIC PHONOGRAPH PICKUP

Filed Dec. 31, 1947

2 SHEETS—SHEET 2

INVENTOR.
DONALD J. BAKER
BY
Ralph B. Stewart
ATTORNEY

Patented Jan. 8, 1952

2,581,511

UNITED STATES PATENT OFFICE 2,581,511

MAGNETIC PHONOGRAPH PICKUP

Donald J. Baker, Los Angeles, Calif.

Application December 31, 1947, Serial No. 795,093

9 Claims. (Cl. 179—100.41)

This invention relates to a phonograph pickup of the variable reluctance type.

An object of the invention is to produce a pickup which has no appreciable resonance effect within the audible range.

In many pickups heretofore developed, the resilient mounting for the vibratory armature is so stiff that the pickup has a natural frequency of vibration falling within the audible range, and in order to prevent distorted reproduction, it has been customary to incorporate vibration dampers in the pickup. Such vibration dampers are not required in the present invention, because the vibratory armature is mounted or suspended by a flexible arrangement which eliminates substantially all resonance effect within the audible range, and any resonance effect which may be present is at a low frequency below the audible range.

A general object of the invention is to devise a phonograph pickup of simple construction and of few parts.

Another general object is to devise a pickup requiring light needle or stylus pressure. A construction according to my invention will provide satisfactory tracking over the complete audio spectrum from 30 to 20,000 cycles per second with a stylus pressure of the order of 12 grams.

Still another general object is to devise a pickup which will produce a flat frequency response over the audio range of 30 to 20,000 cycles and at the same time will provide clean or clear reproduction. For good quality and clean or clear reproduction, it is necessary not only to have flat frequency response, but the reproduction must be free from intermodulation and distortion due to poor tracking, such as bouncing of the stylus in the groove or vibration of the stylus along the groove. If the compliance of the moving system is too low, the stylus will not follow the sound groove properly. The improved results secured by my invention are due in part to the use of a moving system having a very small mass, of the order of 30 milligrams, and having a very high compliance which permits the stylus to track properly at a stylus pressure of the order of 12 grams. Also, the stylus is held against vibration along the groove. With such an arrangement intermodulation is substantially absent and the distortion is negligible.

A specific object of the invention is to devise a phonograph pickup in which the vibratory armature is mounted to permit limited vertical movement and is cushioned against shock due to such movement, whereby wear and damage on the record is reduced.

Another specific object of the invention is to devise a mounting for the armature which will hold the armature against displacement by the drag of the record on the stylus but will permit free movement of the armature at right angles to the direction of the groove and will provide a restoring force on the armature near its lower end for normally holding the armature in neutral position.

Still another object is to devise a pickup in which the winding spool, the armature, and the armature mounting are assembled as a unitary structure which can be manufactured as a unit.

The objects of my invention are attained by mounting the magnetic armature within the winding spool by yieldable or resilient means carried by the spool which normally holds the armature centered or concentric with respect to the spool but permits limited movement of the armature in an axial direction and free movement at right angles to the record groove. In the preferred form of the pickup the upper end of the magnetic armature is pivotally supported by a yieldable member which permits limited axial movement of the armature while yieldably holding the upper end of the armature concentric with the axis of the spool, and the lower end of the armature is maintained in normal position by means of a resilient filament which permits free movement of the lower end of the armature laterally but holds the armature against displacement by the drag of the record on the needle or stylus.

Two embodiments of my invention are illustrated in the accompanying drawing in which Figure 1 is a bottom view of one modification of the pickup with the lower half of the enclosing casing removed;

Figure 1:
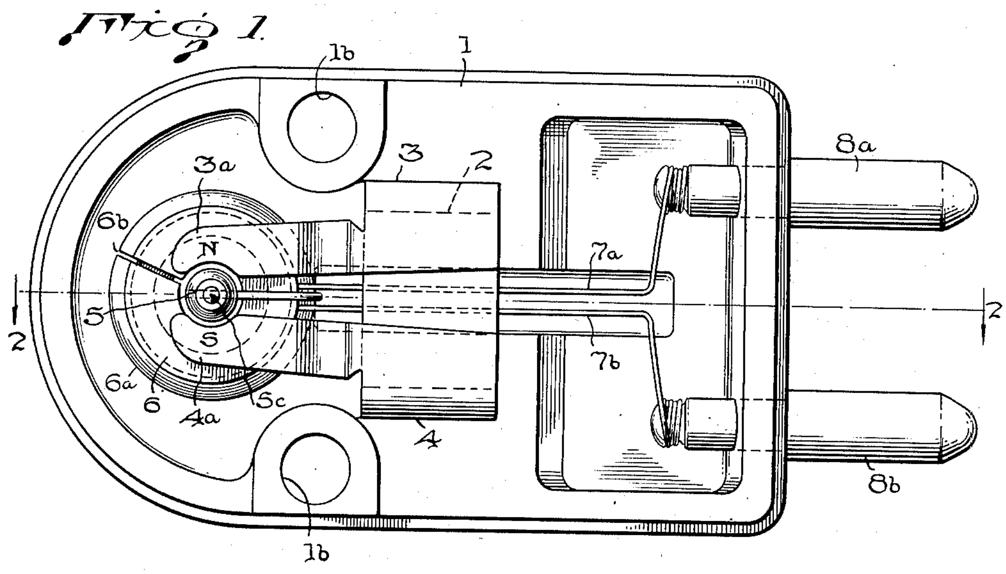
Figure 3:
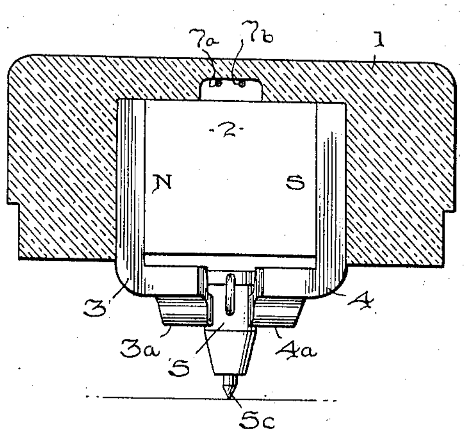
Figure 3 is a sectional view of Figure 2 taken along the cutting plane 3—3 but with the lower half of the casing removed.

Referring to the drawing, the pickup is provided with an elongated casing, the upper half of the casing being shown at 1 and preferably is formed from molded insulating material. Various parts of the pickup are located within recesses formed in the casing 1 and opening through the lower face thereof. A permanent magnet 2 is mounted in a recess formed at the center of the casing 1, transversely of the casing, and a pair of L-shaped pole pieces 3 and 4 formed of soft iron are arranged on the ends of the magnet 2, as shown in Figure 3. The lower arms of pole pieces 3 and 4 are provided with parallel pole extensions 3*a* and 4*a* which extend laterally from the pole pieces towards the front of the casing, and the opposing faces of these pole extensions near the ends thereof are rounded to receive the lower end of the magnetic armature 5, as shown in Figure 1.

Figure 2:
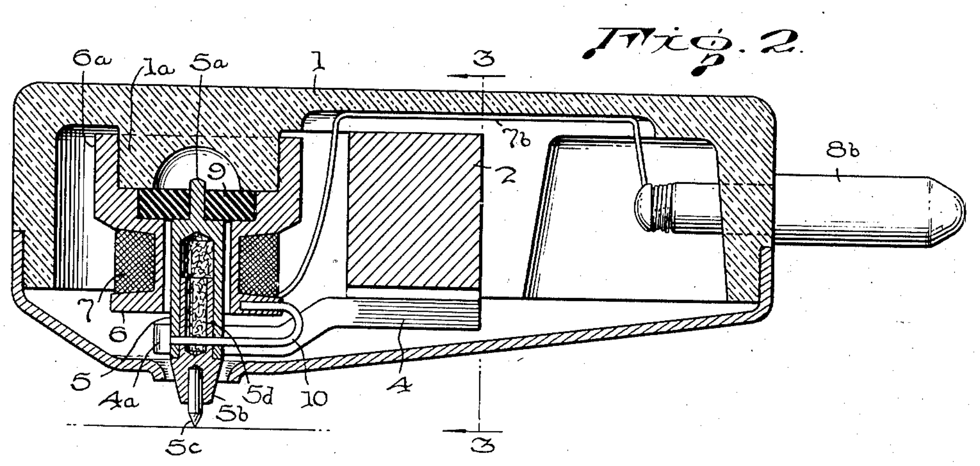
Figure 2 is a sectional view of Figure 1 taken along the cutting plane 2—2 and showing the lower half of the casing in place.

A spool 6 formed of suitable non-magnetic material, preferably metal, such as brass, surrounds the armature 5 and may be mounted within the casing in any suitable manner. One arrangement involves a cylindrical flange 6*a* formed on the upper end of spool 6 and surrounding a boss 1*a* extending downwardly from the upper wall of a cavity formed in the front end of casing 1, the flange 6*a* being cemented to the boss 1*a*. The spool 6 carries a coil or winding 7 which is connected by suitable leads 7*a* and 7*b* to contact prongs 8*a* and 8*b* extending rearwardly from the casing 1. Leads 7*a* and 7*b* pass over magnet 2 through a slot or channel formed in casing 1 as shown in Figures 2 and 3. The spool 6, where formed of metal is slotted through one side as shown at 6*b* in Figure 1 to reduce eddy current effects.

The armature 5 may be formed of a solid piece of magnetic material but preferably is formed of a tubular magnetic member open at the lower end and provided with a reduced stem 5*a* at the upper end extending through a plug or disk of yieldable material 9 mounted at the upper end of the spool 6. Preferably, the disk 9 is mounted within a circular cavity formed in the upper end of the spool 6 as shown in Figure 2. The disk 9 may be formed of any suitable yieldable material such as rubber, and it serves to maintain the upper end of the armature 5 centered or concentric with respect to the axis of the spool 6.

The lower end of armature 5 is closed by a stylus mounting plug 5*b* of light material such as aluminum or magnesium, and preferably this plug is secured in the armature 5 by means of a tubular extension fitting into the lower end of the armature as shown in Figure 2. A stylus point or needle 5*c*, formed of a suitable hard material such as diamond or sapphire, is mounted in a socket formed in the lower end of mounting plug 5*b*, as shown in Figure 2. In case there is any tendency towards the development of resonance within the walls of the armature, the interior space of the armature may be filled with suitable sound absorbent or damping material as shown at 5*d* in Figure 2.

The lower end of the armature 5 normally is maintained centered or concentric with respect to the pole extensions 2*a* and 4*a* and positioned coaxially with the spool 6 by means of a resilient filament which preferably is formed as a U-shaped loop 10 arranged in a vertical plane between the pole extensions 2*a* and 4*a* as shown in the drawing. Loop 10 preferably is formed of non-magnetic material such as Phosphor bronze wire of small diameter, although steel wire may be used if desired. The upper leg of the loop 10 extends into a socket formed radially in the edge of the lower end flange of the spool 6, while the lower leg of the loop 10 passes through a horizontal bore formed transversely through the armature 5, and the mounting plug 5*b*, and the respective legs of the loop are secured to the spool 6 and the armature 5 in any suitable manner as by soldering at the places where they join these members. The armature is held in centered position by a suitable jig while the loop 10 is placed in position and soldered, then the jig is removed.

Loop 10 acts as a restoring element on armature 5 and normally maintains the armature centered or concentric with respect to the spool 6, but permits movement of the armature in all directions at right angles to the leg of the loop connected to the armature. The resistance to movement of the armature is less at right angles to the leg of the loop than in any other direction, and it is greatest in the direction of the leg of the loop. Loop 10 produces a restoring force sufficiently strong to prevent the armature from being held to one side by one of the magnetic poles. The loop 10 is also an efficient shock absorber at the high stylus velocity encountered in the upper end of the audio spectrum, i. e. in the neighborhood of from 5000 to 15,000 cycles per second. The flexible mounting of this wire loop tends to act as an anti-shock in the direction of record travel at these high frequencies. The loop 10 illustrates only one form of resilient connection which may be used between the lower end of the spool 6 and the armature 5.

In operation of the pickup, the armature 5 is held in its neutral position by the resilient filament 10 when the stylus is not in contact with the record, and the armature is magnetized only weakly or not at all. When the stylus is in contact with the record, the lower end of the armature is vibrated from one side to the other of its neutral position, the armature being rocked about a transverse pivotal axis fixed by the disc 9. When the armature moves toward the south pole it becomes magnetized in one direction, and when it moves towards the north pole it becomes magnetized in the opposite direction. The reversal of the magnetic flux within the armature, or the change of the flux within the armature, causes a voltage to be reduced in the pickup coil 7 in a well known manner, thereby converting the sound record into corresponding current variations.

Figure 4:
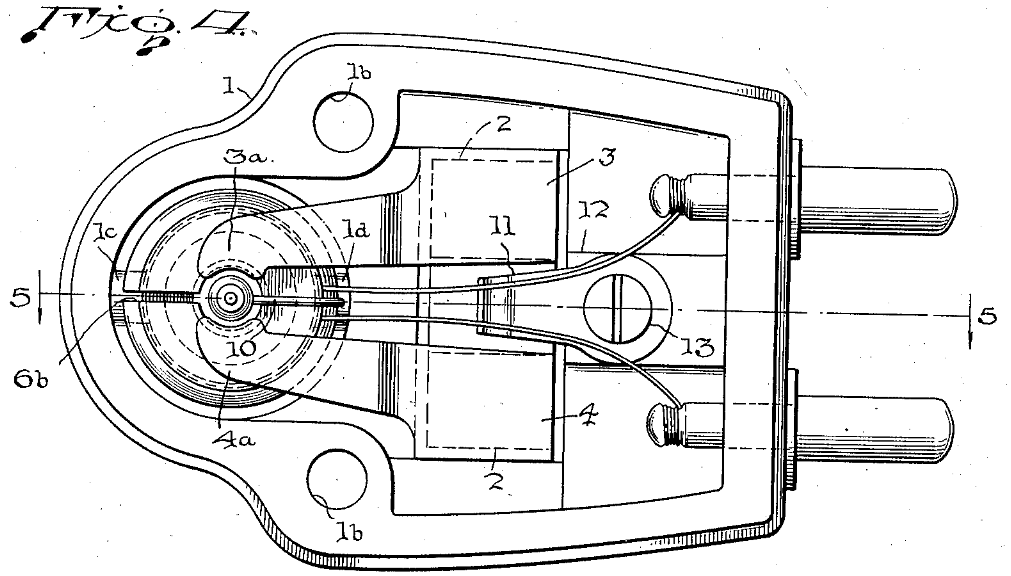
Figure 4 is a bottom view of another modification of the pickup with the lower half of the enclosed casing removed and showing the use of a U-shaped magnet with a novel arrangement for mounting the magnet in the casing.
Figure 5:
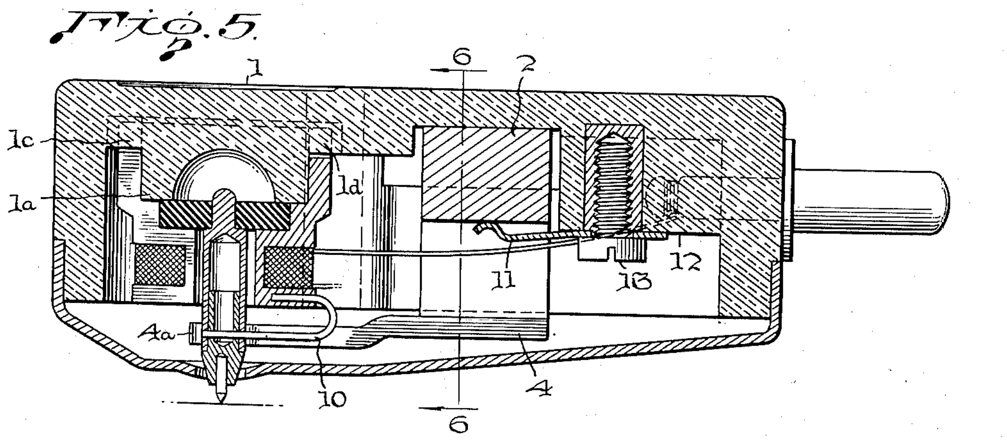
Figure 5 is a sectional view of Figure 4 taken along the cutting line 5—5 and showing the lower half of the casing in place.
Figure 6:
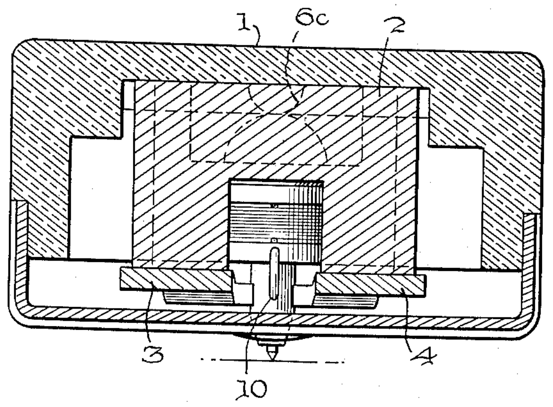
Figure 6 is a sectional view of Figure 5 taken along the cutting plane 6—6.

The modification shown in Figures 4 to 6, inclusive, is generally like that shown in Figures 1 to 3 but differs in certain details of construction. The same reference characters are used to indicate the same elements.

The unitary structure of the winding spool with the armature mounted therein is the same as in Figures 1 to 3, except that the cylindrical flange 6*a* of the spool 6 is provided with semicircular slots 6*c* (Figure 6) arranged on opposite sides of the flange and fitting over positioning ribs 1*c* and 1*d* of semicircular shape and formed on opposite sides of the boss 1*a*. This construction insures the proper alignment of the resilient filament 10 with the axis of the pickup. The slot 6*b* in the spool 6 in Figures 4 to 6 is formed in the vertical longitudinal plane of the pickup.

The magnetic structure used in Figures 4 to 6 also differs from that shown in Figures 1 to 3 in that the magnet 2, instead of being a plain bar magnet, is a U-shaped magnet with its polar axis arranged transversely of the casing and with its back seated in a shallow cavity formed in the upper wall of the casing 1. Also, the pole pieces 3 and 4 are formed simply of horizontally arranged soft iron pieces soldered or otherwise secured to the end faces of the downwardly extending arms of magnet 2. The pole extensions 3a and 4a are of the same shape as shown in Figures 1 to 3.

As shown in Figures 4 to 6, the recess in which the magnet 2 is seated is somewhat larger than the back of the magnet, and this allows for adjustment of the magnet in all directions in a horizontal plane to center the pole extensions with respect to the armature. In assembling the arrangement, a small quantity of cement is first placed on the surface to receive the magnet, and the magnet is then placed in position and adjusted until arcuate faces of the polar extensions become concentric with the armature. The magnet with the attached pole pieces is held in proper adjusted position and is clamped in this position by a cantilever spring 11 supported on a boss 12 and clamped in position by a clamping screw 13. The magnet is clamped in position by the spring 11 while the cement is still wet, and after the cement hardens the magnet is securely held in position to provide proper centering of the pole piece extensions with respect to the magnetic armature. By using a spring of sufficient stiffness, the magnetic system may be held in position by the spring alone and without the use of cement.

The improved operation obtained by my pickup is believed to be due to the shortness of the armature, the small mass of the moving system, the balanced mounting of the magnetic armature, including the block of yieldable material for supporting the upper end of the armature for limited yielding movement in all directions, and the relatively light resilient filament for supporting the lower end of the armature against movement in the direction of the sound groove but permitting axial movement and lateral vibration thereof. Another important factor is that the suspension filament which supplies the restoring force is connected to the armature at a point very close to the tip of the stylus. In one specific unit the moving system of the pickup had a resonance frequency in the neighborhood of 900 cycles per second with the stylus free, but when the stylus was placed in contact with the record, the natural frequency was reduced to a sub-audio frequency. The highly cushioned suspension of the armature provides a high degree of compliance so that the stylus follows the groove faithfully and there is substantially no tendency towards the development of resonance effects in the armature when the stylus is in contact with the record.

From the foregoing it is clear that the arrangement by which the magnetic armature is mounted within the non-magnetic winding spool, including the wire loop, is formed as a unitary structure which may be manufactured and assembled as a unit independently of the other parts of the pickup.

My pickup is well adapted for manufacture in small sizes. By way of example, it is easily possible to construct the pickup so that the over-all dimensions of the casing are of the order of one inch in length, less than ¾ inch in width and less than ½ inch in vertical thickness. In a pickup of this size, the winding spool will have an outside diameter of the order of ¼ inch, the armature will have an outside diameter of the order of 0.06 inch and an over-all length including the stem and stylus tip is not appreciably in excess of one-quarter of an inch, and the loop 10 is formed of Phosphor bronze wire having a diameter of 10 mils.

The frequency response of the pickup will depend not only upon the mass of the moving system, but also on the shore hardness and thickness of the yieldable mounting for the upper end of the armature, and also upon the size of the wire and the length of the loop. By varying the shore hardness and thickness of the rubber mounting and the size of the wire and the length of the loop, the frequency range of the pickup can be controlled and be made to cover any desired range of the frequency scale. Good results have been obtained using rubber of #60 shore.

The pickup may be secured to a suitable tone arm by mounting screws, not shown, passing through a pair of holes 1b formed in the pickup casing.

I claim:

1. A pickup unit comprising an elongated casing, a magnet arranged within said casing with its polar axis transversely thereof, a non-magnetic spool carrying a coil arranged within said casing at the forward end of the casing and with its axis in substantially a vertical direction, a pair of soft iron pole pieces engaging the opposite ends of said magnet and having polar extensions extending forwardly of the casing and terminating adjacent each other at the lower end of said spool and on opposite sides of the spool axis, a magnetic armature positioned within said spool, a disk of yieldable material carried by the upper end of said spool and engaging the upper end of said armature to hold the same centered on the axis of said spool, and a U-shaped loop of resilient wire arranged in a vertical plane between said pole extensions and having the upper leg thereof secured in a socket formed radially in lower end flange of said spool, the lower leg of said loop being secured in a bore formed transversely through said armature near the lower end thereof and serving normally to maintain the lower end of said armature concentric with respect to the axis of said spool.

2. A pickup unit comprising a spool carrying a coil, a magnetic armature arranged within said spool, a pivotal mounting for said armature comprising yieldable means carried by the upper end of said spool and engaging said armature to yieldably hold the upper end thereof centered on the axis of said spool, and fixing the pivotal axis of said armature at the upper end thereof, and resilient means carried by the lower end of said spool and connected to said armature near the lower end thereof for yieldably supporting the lower end of the armature for vibratory movement about said vibratory axis in one plane and for restraining said armature against movement in a direction normal to said plane.

3. A pickup unit comprising a winding spool, a magnetic armature arranged within said spool, pivotal mounting means carried by the upper end of said spool for supporting the upper end of said armature for yielding movement in all directions and fixing the pivotal axis of the upper end thereof, and means carried by the lower end of said spool and connected to said armature for supporting the lower end of said armature against movement in a direction radially of the axis of said spool and for permitting yielding movement of said lower end of said armature at right angles to said radial direction.

4. A unitary assembly for a pickup device comprising an elongated armature carrying a stylus at one end thereof, a support having an aperture formed therein, a plate-like piece of flexible material carried by said support and closing said aperture, said plate-like piece having a central aperture formed therein and said armature being mounted within the aperture of said plate-like piece and being supported by said piece for rocking movement of the armature about a transverse axis located in the plane of said plate-like piece, means for resisting record drag on said armature, and for applying a laterally directed restoring force to said armature, comprising a resilient wire secured to said armature near the stylus end thereof and extending transversely of said armature and parallel with the direction of record drag, and means rigidly securing the outer end of said wire to said support.

5. A pickup unit comprising a winding spool, a magnetic armature arranged within said spool, means carried by one end of said spool for supporting one end of said armature for yielding movement of said end axially of said spool and in all directions radially of said spool, and a resilient filament having one end thereof secured to said armature adjacent the other end of said spool and extending radially from said armature, the other end of said filament being secured to said other end of said spool, whereby said other end of said armature is supported by said filament for yielding movement in all directions at right angles to the axis of said filament.

6. A pickup unit comprising a spool carrying a coil, one end of said spool having a circular recess formed in the outer face thereof, a circular disk of yieldable material secured within said recess and extending over the central bore of the spool, a magnetic armature arranged within said spool and having one end thereof engaging said disk and being supported by said disk whereby said disk normally maintains the engaged end of said armature centered on the axis of said spool, and a U-shaped resilient filament at the other end of said spool and arranged in a plane passing through the axis of said spool and having one leg thereof secured to the other flange of said spool, and the second leg of said filament being secured to the other end of said armature and normally maintains said other end of said armature centered on the axis of said spool.

7. A stylus mounting comprising an elongated magnetic armature having a stylus mounted on the lower end thereof, a pivotal support mounting said armature in a vertical position comprising yieldable means connected with the upper end of said armature and distributed uniformly about said armature for supporting said end for yielding movement in all directions, and resilient means connected to said armature near the lower end thereof for mounting said lower end for vibratory movement in a predetermined plane about the point of support of the upper end of the armature and for restraining movement of the lower end of said armature in a direction normal to said plane.

8. A stylus mounting comprising an elongated magnetic armature having a stylus mounted on the lower end thereof, a pivotal support mounting said armature in a vertical position comprising a block of rubber engaging the upper end of said armature and supporting said end for limited yielding movement in all directions, and resilient means connected to said armature near the lower end thereof for mounting said lower end for vibratory movement in a predetermined plane about the point of support of the upper end of the armature and for restraining movement of the lower end of said armature in a direction normal to said plane.

9. A stylus mounting comprising a tubular magnetic armature, a metallic plug closing the lower end of said armature, a stylus imbedded in said plug in axial alignment with said armature, a pivotal support mounting said armature in a vertical position comprising a block of rubber engaging the upper end of said armature and supporting said end for limited yielding movement axially thereof and in all directions radially thereof, a resilient filament means supporting said filament radially of said armature near the lower end thereof, said filament being connected to the lower end of said armature for supporting the lower end of said armature for movement in all directions at right angles to the axis of said filament and for restraining movement of said lower end along the axis of said filament, and vibration absorbing material filling the interior of said armature.

DONALD J. BAKER.

REFERENCES CITED

The following references are of record in the file of this patent:

UNITED STATES PATENTS

| Number | Name | Date |
|---|---|---|
| 1,504,433 | Corswandt | Aug. 12, 1924 |
| 1,671,105 | Farrand | May 29, 1928 |
| 1,735,873 | Pack | Nov. 19, 1929 |
| 1,774,975 | Hillner | Sept. 2, 1930 |
| 1,914,191 | Ault | June 13, 1933 |
| 1,944,258 | Mitchell | Jan. 23, 1934 |
| 2,092,884 | Kendall | Sept. 14, 1937 |
| 2,222,342 | Thompson | Nov. 19, 1940 |
| 2,373,181 | Fleming | Apr. 10, 1945 |
| 2,400,305 | Hazeltine | May 14, 1946 |
| 2,412,718 | Dalley | Dec. 17, 1946 |

FOREIGN PATENTS

| Number | Country | Date |
|---|---|---|
| 336,648 | Great Britain | Oct. 15, 1930 |